March 27, 1934.   L. G. COPEMAN   1,952,422
STORAGE AND DISPENSING UNIT FOR FROZEN FOODS
Filed Nov. 17, 1930   2 Sheets-Sheet 1

INVENTOR.
LLOYD G. COPEMAN
BY Barnes & Kisselle
ATTORNEYS

March 27, 1934.   L. G. COPEMAN   1,952,422
STORAGE AND DISPENSING UNIT FOR FROZEN FOODS
Filed Nov. 17, 1930   2 Sheets-Sheet 2

INVENTOR.
LLOYD G. COPEMAN.
BY Barnes & Kisselle
ATTORNEYS.

Patented Mar. 27, 1934

1,952,422

UNITED STATES PATENT OFFICE 1,952,422

STORAGE AND DISPENSING UNIT FOR FROZEN FOODS

Lloyd G. Copeman, Flint, Mich., assignor to Copeman Laboratories Company, Flint, Mich., a corporation of Michigan Application November 17, 1930, Serial No. 496,116

14 Claims. (Cl. 62—89)

This invention relates to a storage and dispensing unit for frozen foods for maintaining quickly frozen foods at the proper temperature.

In order to preserve the quality of quickly frozen foods it has been found necessary to keep the same at a temperature lower than ten degrees F. above zero. If the temperature of the frozen food is allowed to go above ten degrees above zero it greatly impairs the flavor and quality which was originally present in the food. Much difficulty has therefore been presented in designing suitable storage containers and dispensing units for maintaining this vital temperature.

It is the object of the present invention to provide a storage and dispensing unit having a large number of individual containers each of a special shape conforming approximately to the shape of the frozen articles of food and each individually refrigerated whereby each separate compartment is maintained at the desired low temperature. Because of the fact that each compartment is individually refrigerated and is designed relative to the size of the article to be stored, it will be obvious that a temperature more closely approximating ten degrees above zero may be maintained than would be possible if a large space were used for storing all the articles in the mass.

Another feature of the present invention resides in the provision of a storage and dispensing unit made up of a plurality of individual compartments, individually refrigerated and movable in open position as a unit. In other words, the sharp freezing unit and the trays or containers are formed as one unit and movable relative to the casing.

Other features of the invention reside in the providing of the individual container units themselves with a plurality of storage spaces adapted to closely fit the article to be stored; the provision of individual storage compartments having varying cross sectional shapes to accommodate different sized frozen articles of food, and other features of construction as will be more clearly brought out in the specification and claims.

One of the primary features of the present invention resides in the forming of a plurality of individual container units or receptacles for storing food and from which the articles of food may be dispensed. These container units or receptacles have a shape corresponding to the shape of the article to be stored with the result that not only is each stored article uniformly and individually refrigerated on substantially all sides but by confining the storage space to a comparatively small container it is possible to temporarily subject said container to normal atmospheric conditions without causing appreciable circulation of air within the container.

In other words, each container unit embodies the principle of a top icer as the walls of each container are uniformly refrigerated by direct contact there can be no appreciable circulation after the container is once brought to the desired low temperature.

Figure 1:
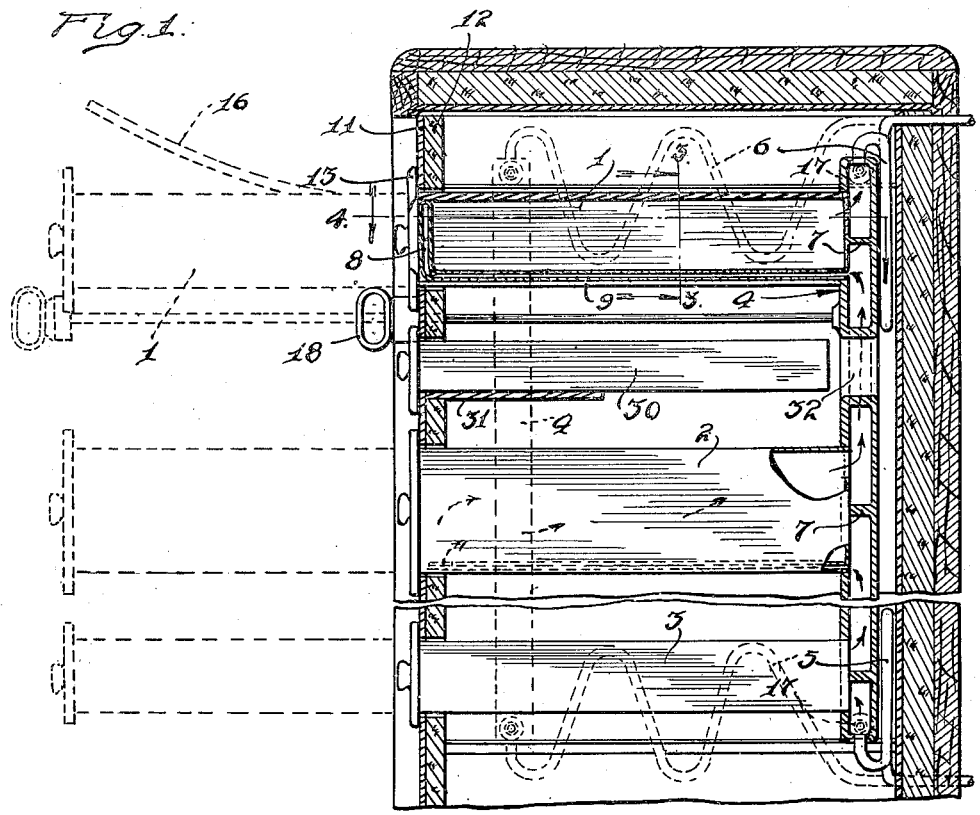
Fig. 1 is a fragmentary vertical sectional view of a storage and dispensing unit covering the features of the present invention and showing in particular the complete cooling and storing unit in normal closed position in solid lines and its outer position in dotted lines.
Figure 2:
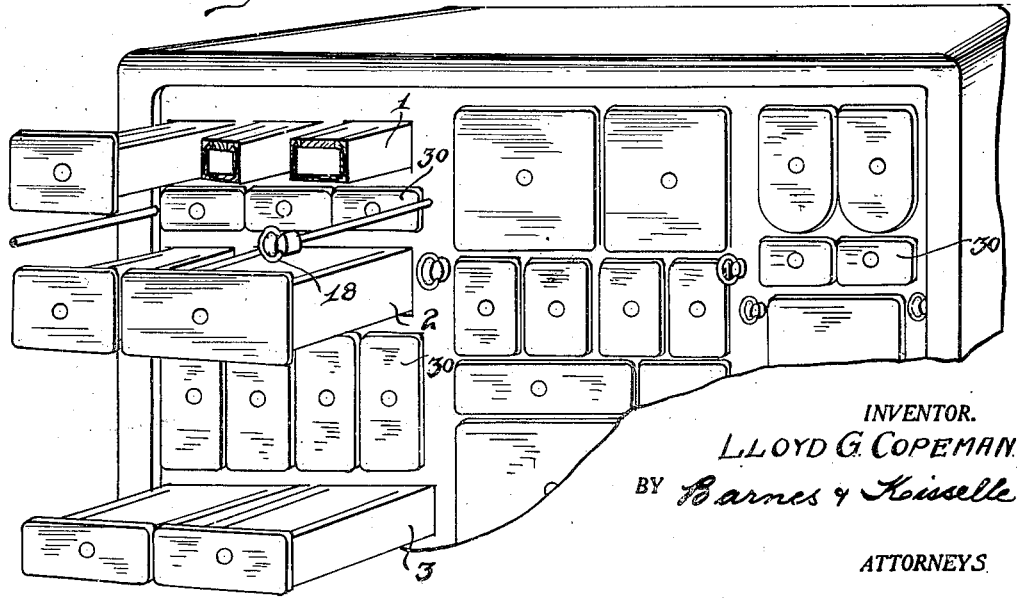
Fig. 2 is a fragmentary perspective view illustrating the front of one embodiment of the invention wherein a plurality of the storage compartments are shown moved to their outer position.

In the embodiment shown in Fig. 1 a plurality of containers 1, 2, and 3 are shown formed as an integral part of a movable header 4. This header 4 may vary in construction with the type of refrigerating system being used but it preferably has suitable flexible inlet and outlet conduits 5 and 6 which permit the header and the connected container units to be moved outwardly of the cabinet as illustrated in dotted lines in Fig. 1.

The walls of the containers 1, 2 and 3 are preferably hollow so as to permit circulation therethrough and in one form of carrying out my invention I provide the header with partitions 7 intermediate the height of each container and connect the hollow front wall 8 and bottom wall 9 with the header below said partitions and the hollow side walls 10 with the hollow front wall 8 and the portion of the header above the partition 7. In this manner the refrigerant will take the course indicated by the arrows in Fig. 1, first flowing through the bottom hollow wall to the front wall 8 and then back around the two side walls 10 to the portion of the header above the partition 7, thus causing positive circulation at all times.

The interior of the main cabinet is preferably kept as free from air circulation as possible and for this purpose I have provided a suitable rubber front or apron 11 which may be suitably secured to the front wall 12, which wall may also be of suitable insulating material. This rubber front not only prevents ice from adhering thereto but makes such contact with the flange 13 of the container closure as to efficiently seal the cabinet and at the same time prevent sticking of the closure member 13 to the wall.

Figure 3:
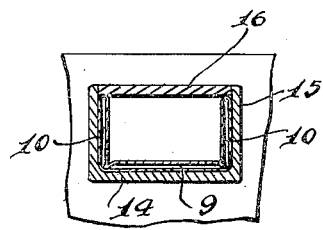
Fig. 3 is a section taken on line 3—3 of Fig. 1 and illustrating one manner of forming the combined container and refrigerating unit so as to cause positive circulation of the refrigerant.
Figure 4:
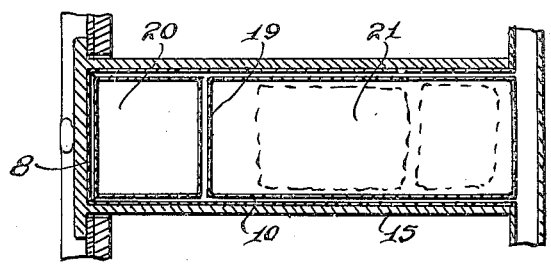
Fig. 4 is a sectional plan view taken on line 4—4 of Fig. 1 and illustrating one arrangement of the front, side and partition walls of the sharp freezing container.

As shown in Fig. 1, the sharp freezing container 1 may be substantially surrounded by a rubber sleeve including the rubber closure member 13. In this case the rubber sleeve may consist of the bottom wall 14 and side walls 15, as best shown in Figs. 3 and 4. The top wall 16 is preferably removable to permit access to the container from the top. By using a rubber sleeve as shown, it will be seen that it is possible to at all times remove the individual refrigerated container from a compartment regardless of any moisture condensation thereon as the ice will not adhere to the rubber sleeve. This rubber sheath also protects the containers when the entire unit consisting of the header and plurality of containers is moved outwardly. Thus, in addition to opening the containers from the top to prevent air circulation within the containers when moved outwardly the rubber sheath around same materially reduces any transfer of heat between the contents of the container and the atmosphere. It will be understood that the sleeve formed by the walls 14 and 15 may be formed of other material besides rubber and if desired of a much better insulating material; however, what rubber lacks as an insulating material it makes up for in preventing condensation of moisture upon the surfaces of the containers. What moisture should condense on the containers when they are pulled out of the cabinet is very easily scraped off when the containers are moved inwardly.

The apertures in the rubber front 11 and the front wall 12 are, of course, shaped to closely fit the movable drawers 1, 2 and 3, and so forth. The bottom walls of the openings will therefore help to support the front ends of the various container members 1, 2 and 3 while the header 4 may be provided with suitable roller bearings 17 adapted to engage suitable tracts mounted at the sides of the cabinet. These rollers will, of course, take most of the weight off the entire unit so that it may be easily moved in and out of the cabinet by means of suitable actuating members 18.

As best shown in Fig. 4, the sharp freezing containers may be divided longitudinally by means of suitable partitions 19 which are preferably hollow and adapted to circulate refrigerant. Thus the sharp freezing containers may be given various shapes both as to cross section and longitudinal dimensions. For instance, in the compartment 20 of the container shown in Fig. 4 one or a plurality of articles or packages of food of square cross section may be stored, and in the compartment 21 a plurality of articles or packages of rectangular cross section may be stored.

Figure 5:
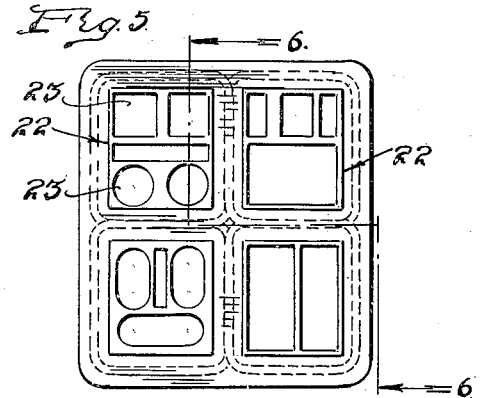
Fig. 5 is a front elevation of a storage dispensing unit wherein the sharp freezing chambers are formed by the walls of the cooling unit and of a special shape to receive container units of the corresponding shape.
Figure 6:
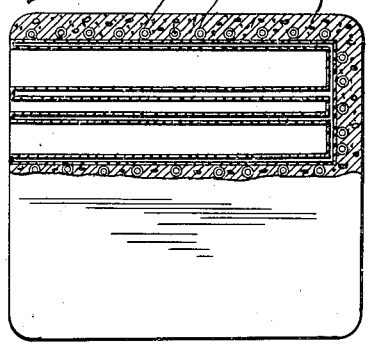
Fig. 6 is a sectional view taken on line 6—6 of Fig. 5 showing the individually refrigerated containers surrounded with stone with embedded refrigerant circulating pipes.

In the modification shown in Figs. 5 and 6 I preferably utilize one or more evaporating units 22 which are formed to each provide a plurality of different shaped and sized openings 23. This evaporator is preferably surrounded with a coating of artificial stone 24 and the refrigerant, in addition to circulating through the hollow walls of the evaporator 22 preferably also is circulated through the stone by means of suitable coils 25. The stone acts as an efficient hold-over and each separate chamber 23, being provided with a thin wall of refrigerant, it will be seen that the container units placed in the respective chambers may be maintained at a very low temperature.

Figure 7:
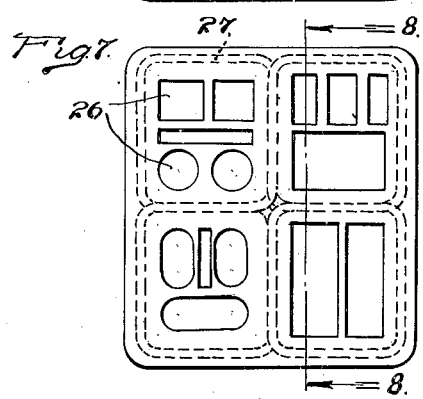
Fig. 7 is a view similar to Fig. 5 but showing the specially formed sharp freezing chambers as being formed directly by the stone walls.
Figure 8:
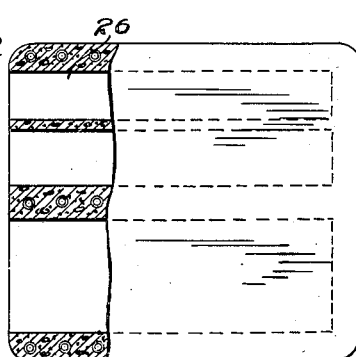
Fig. 8 is a section taken on line 8—8 of Fig. 7.
Figure 9:
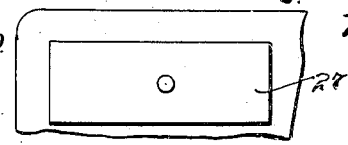
Figs. 9 and 10 represent fragmentary front and sectional views showing the use of a flanged front container unit.
Figure 10:
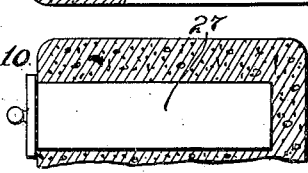
Figure 11:
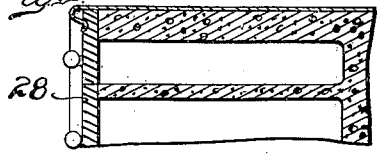
Fig. 11 is a sectional view similar to Fig. 10 but showing the use of a rubber front for the unit.

In the modification illustrated in Figs. 7 and 8 each of the specially shaped and sized chambers 26 are formed of the artificial stone itself in which case the refrigerant conducting coils 27 are so positioned in the stone as to be sure of the correct heat transfer uniformly over all the walls of the respective chambers. The containers 27 which are adapted to fit within the apertures 23 and 26 of the unit shown in Figs. 5 and 7 may be of any standard type so long as they are of the proper cross sectional shape as to nicely fit within the specially shaped chambers 23 and 26. If desired, the front wall of the cabinet shown in Figs. 6 and 8 may be formed of sponge rubber as shown at 28 so as to seal the interior of the cabinet as much as possible.

In order to provide ample space between the unitary movable drawers 1, 2 and 3, etc. in Fig. 1, and at the same time obtain the benefit of such space, I preferably provide suitable independent container units 30. These units 30 may be suitably supported by means of inwardly extending members 31 and the header member 4 may be provided with suitable apertures 32, as best shown in Fig. 1, so as to permit the header to slide outwardly as a unit without disturbing the individually movable units 30. While these individually operated containers 30 will not be maintained at the same low temperature as the refrigerant surrounded containers they nevertheless will be maintained at reasonably low temperatures. Some foods not requiring such a low temperature maintenance may thus be stored in these individually operated containers or, if desired, such containers may be utilized as ice cube manufacturing and storage units. In many cases the separately removable units 30 could probably be maintained at a temperature but a very few degrees higher than the temperature maintained within the units mounted as a part of the refrigerant header.

It will thus be seen that I have provided a storage and dispensing cabinet for maintaining quickly frozen foods at the proper temperature. Frozen foods whether packaged or not, are necessarily of different shapes and sizes. Different sized articles or packages of food may be placed in the particular container or compartment shaped to especially receive such article or package. Each individual container being separately refrigerated, and as the main container units are movable integrally with the refrigerant header, it will be seen that the refrigeration of each individual unit is maintained at all times. In view of the fact that the containers preferably open from the top, it will be seen that the intense cold is maintained at all times because of the fact that positive circulation of air within the containers is prevented. I am aware that containers have been made for standard domestic cooling units to receive articles of food of a given size but I believe I am the first person to provide individually refrigerated and specially shaped container units for storing and dispensing foods frozen at a very low temperature.

What I claim is:

1. A storage and dispensing unit for maintaining quickly frozen foods at preserving temperatures, comprising a cabinet having an apertured wall, and a plurality of container units having hollow walls for receiving the refrigerant, said container units being movable outwardly of the cabinet through said apertures.

2. A storage and dispensing unit for maintaining quickly frozen foods at preserving temperatures, comprising a cabinet, a plurality of container units having hollow walls for receiving the refrigerant, said container units being movable outwardly of the cabinet, and a refrigerant header unit connected to said containers for circulating a refrigerant through said hollow walls.

3. A storage unit for maintaining quickly frozen foods at relatively low temperatures comprising a cabinet having a permanent front, said front being provided with a plurality of apertures for receiving and guiding food container units, said container units being of a special shape and size to receive articles of food of a corresponding shape and size, rubber sealing means for maintaining a tight seal between the front and said containers when positioned within the cabinet, and refrigerant circulating means surrounding and closely approximating the cross sectional shape of the containers when positioned within the cabinet.

4. A storage cabinet for maintaining frozen foods at preserving temperatures, comprising an insulated and apertured front wall, food containers, said apertures being of a special shape corresponding to the shape of said containers and said containers being individually shaped to receive articles of food having a corresponding shape, said containers being movable through said apertures into heat conducting relation with refrigerating means of substantially the same shape as each individual container or isolated group of containers.

5. A storage cabinet for maintaining frozen foods at preserving temperatures, comprising an insulated and apertured front wall, food containers, said apertures being of a special shape corresponding to the shape of said containers and said containers being individually shaped to receive articles of food having a corresponding shape, said containers being movable through said apertures into heat conducting relation with refrigerating means of substantially the same shape as each individual container or isolated group of containers, said containers opening from the top whereby to retard circulation in each individual container.

6. In a storage cabinet of the class described, a container provided with a plurality of compartments and mounted to slide outwardly from the cabinet to receive and dispense frozen foods, each compartment being shaped as to cross sectional and longitudinal dimensions to receive frozen foods of a given shape and size, at least three of the walls of each compartment being directly backed by refrigerant.

7. In a storage unit of the class described, a relatively movable container provided with a plurality of compartments, each compartment being shaped as to cross sectional and longitudinal dimensions to receive frozen foods of a given shape and size, at least five of the walls of each compartment being directly backed by refrigerant.

8. A food receptacle for storage units of the class described comprising one or more compartments shaped according to the shape of the articles of food to be stored therein and slidable outwardly from the storage unit to receive and dispense the articles of food, and means forming a part of said receptacle for maintaining the same at relatively low temperatures, said receptacle being normally supported by a stationary part of said unit.

9. A food receptacle for storage units of the class described comprising one or more compartments shaped according to the shape of the articles of food to be stored therein, and means forming a part of said receptacle for maintaining the same at relatively low temperatures, the side and bottom walls of said receptacle being formed of rubber, a material to which ice does not readily adhere.

10. A food receptacle for storage units of the class described comprising one or more compartments shaped according to the shape of the articles of food to be stored therein, means forming a part of said receptacle for maintaining the same at relatively low temperatures, the side and bottom walls of said receptacle being formed of a material to which ice does not readily adhere, and an apertured front wall closely fitting said receptacle for removing any ice that may have formed on the outer surfaces.

11. A storage and dispensing cabinet of the class described, comprising a plurality of individually refrigerated food container receptacles movable outwardly as a single unit from the cabinet and a plurality of containers separately mounted in the cabinet.

12. A storage and dispensing cabinet of the class described, comprising a plurality of individually refrigerated food container receptacles movable outwardly as a single unit from the cabinet and a plurality of containers separately mounted in the cabinet, and so spaced between the integrally movable food receptacles as to permit easy access to said food receptacles when in an outwardly movable position.

13. A cabinet for storing and dispensing frozen foods comprising one or more containers movable outwardly of the cabinet and means for circulating a refrigerant in heat conducting relation to said container or containers, said means being movable with the container.

14. A storage and dispensing unit for maintaining frozen foods at relatively low preserving temperatures, comprising a cabinet including an apertured wall and a combined cooling and container unit positioned within said cabinet and slidable through said aperture for dispensing articles directly from the cooling unit, said unit having hollow walls for receiving and circulating a refrigerant.

LLOYD G. COPEMAN.